United States Patent
Loose et al.

(12)

(10) Patent No.: US 6,273,243 B1
(45) Date of Patent: Aug. 14, 2001

(54) DEVICE FOR CORRECTING THE COURSE OF A BELT

(75) Inventors: Jochen Loose, Constance; Falk Schaal, Alpirsbach, both of (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/101,715

(22) PCT Filed: Dec. 20, 1996

(86) PCT No.: PCT/EP96/05763

§ 371 Date: Jul. 16, 1998

§ 102(e) Date: Jul. 16, 1998

(87) PCT Pub. No.: WO97/26470

PCT Pub. Date: Jul. 24, 1997

(30) Foreign Application Priority Data

Jan. 16, 1996 (DE) .............................. 196 01 255

(51) Int. Cl.⁷ .................................................. B65G 39/16
(52) U.S. Cl. ................................................................ 198/808
(58) Field of Search ............................... 198/806–808, 198/840; 226/21; 474/109, 123

(56) References Cited

U.S. PATENT DOCUMENTS

| 3,075,633 | 1/1963 | Presti . |
| 4,084,683 | * 4/1978 | Moss ................................. 198/806 |
| 4,901,903 | * 2/1990 | Blanding ............................. 226/21 |
| 5,052,547 | * 10/1991 | Doi .................................... 198/806 |
| 5,471,289 | 11/1995 | Satoh et al. . |

FOREIGN PATENT DOCUMENTS

| 686507A5 | 4/1996 | (CH) . |
| 1965023 | 1/1971 | (DE) . |
| 2062324 | 7/1971 | (DE) . |
| 924677 | 5/1963 | (GB) . |
| 4-185944 | 7/1992 | (JP) . |

* cited by examiner

*Primary Examiner*—Joseph E. Valenza
(74) *Attorney, Agent, or Firm*—Venable; George H. Spencer; Catherine M. Voorhees

(57) ABSTRACT

The invention relates to a device for correcting the run of a belt automatically, in particular, for item sorting systems, having a rotatable adjusting roller which can be adjusted in its inclination, wherein, via a lever arm of the adjusting roller mount and a spring force acting on the lever arm, a torque is generated at the rotary axis to adjust the inclination of the adjusting roller. This torque compensates for the torque which is exerted on the adjusting roller mount via the adjusting roller by the belt tension during a centered run of the belt. The angle of wrap at the adjusting roller, its direction of inclination, the direction of the run of the belt, the tangential direction of the belt at the adjusting roller as well as the spring path and the characteristic spring curve of the spring element are selected such that, in the event of the inclination of the adjusting roller due to the change of moment resulting from an off-center belt run, a directional component opposite to the off-center direction of deflection is imparted to the belt on the adjusting roller.

8 Claims, 3 Drawing Sheets

DEVICE FOR CORRECTING THE COURSE OF A BELT

BACKGROUND OF THE INVENTION

The invention relates to a device for correcting the run of a belt.

It is an important requirement with respect to the run of a belt that the belt is prevented from running off of the deflecting rollers and of the driving rollers.

Since the belt attempts to always run on the highest point of a roller, crowned rollers are used for the most part which center the belt. However, especially for relatively long belt runs, it cannot be prevented that disturbing influences—e. g. rollers standing at an incline, twisted belts - will attempt to push the belt off of the rollers.

It has been disclosed to use deflecting rollers adjustable with respect to their inclination, so-called adjusting rollers, to compensate for these disturbing influences (DE-Patent 1965023). The axle body can be pivoted around a rotary axis disposed transversely to the roller axis; the pivot position of the axle body is secured by means of an adjusting screw or a threaded pin. For each change of the run of the belt, the inclination of the adjusting roller must be reset manually. This results in an increased maintenance and monitoring outlay.

SUMMARY OF THE INVENTION

Therefore, it is the object of the invention to create an automatic inclination adjustment of adjusting rollers which corrects the off-center run of a belt on the adjusting roller automatically.

This object is accomplished according to the invention in which the torque change at the rotary axis, around which the adjusting roller is pivoted, causes an inclination of the adjusting roller as a result of the off-center run of the belt (changed lever arm) such that a movement component toward the center of the roller is imparted to the belt on the roller.

In another advantageous feature of the invention influences of a changing belt tension are compensated for with the assistance of a reference roller fastened on a pivotable lever.

This reference roller is pushed against the belt via the lever by means of the same spring element. The spring element and lever arms are dimensioned such that, e. g., a reduced belt tension results in a spring force acting on the adjusting roller, which force is reduced at the same ratio owing to the deflection change of the reference roller. Advantageously, the spring force of the spring element can be set. Furthermore, it is advantageous for the adjusting rollers and reference rollers to be configured in a crowned manner.

It also proved to be advantageous to implement the angle of wrap on the adjusting roller in a range from approximately 6° to 25°.

In a further advantageous embodiment of the invention, the device for correcting the run of a belt is inclined by approx. 30° to 60° vis-a-vis the tangential direction of the belt at the adjusting roller on the run-out side of the belt.

The invention is explained in an example in greater detail by way of the figures.

BRIEF DESCRIPTION OF THE DRAWINGS

FIGS. 3a, 3b, 3c are side views taken in the direction shown by the arrow labeled view a in FIG. 1 of the device according to the invention corresponding to FIGS. 1 and 2, in which FIG. 3a shows a centered run of the belt, FIG. 3b shows the belt deflected downward and FIG. 3c shows the belt deflected upward.

DETAILED DESCRIPTION OF THE PREFERRED EMBODIMENTS

Figure 1:
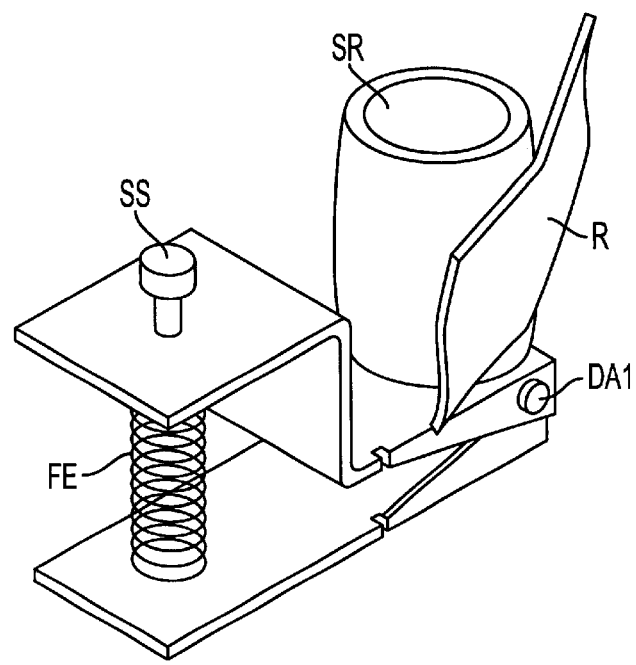
FIG. 1 is a perspective schematic representation of a device according to the invention.

According to FIG. 1, a crowned adjusting roller SR, past which the belt R is guided, is seated so as to be pivotable around a rotary axis DA1.

The crowning of the rollers has the effect that, in the event of small deviations from the centered run, the belt centers itself on the rollers. If the deviations become larger, the device according to the invention is necessary wherein the adjusting roller SR is supported by a spring element FE via a lever arm. The crowning of the adjusting roller SR is not necessary for the functioning of the device, but it enhances the running smoothness for very small deviations. The spring force F2 can be changed by means of an adjusting screw SS and thus the inclination of the adjusting roller SR can be adjusted.

The angle of wrap of the belt R on the adjusting roller SR has an advantageous range of approx. 6° to 25 °.

Figure 2:
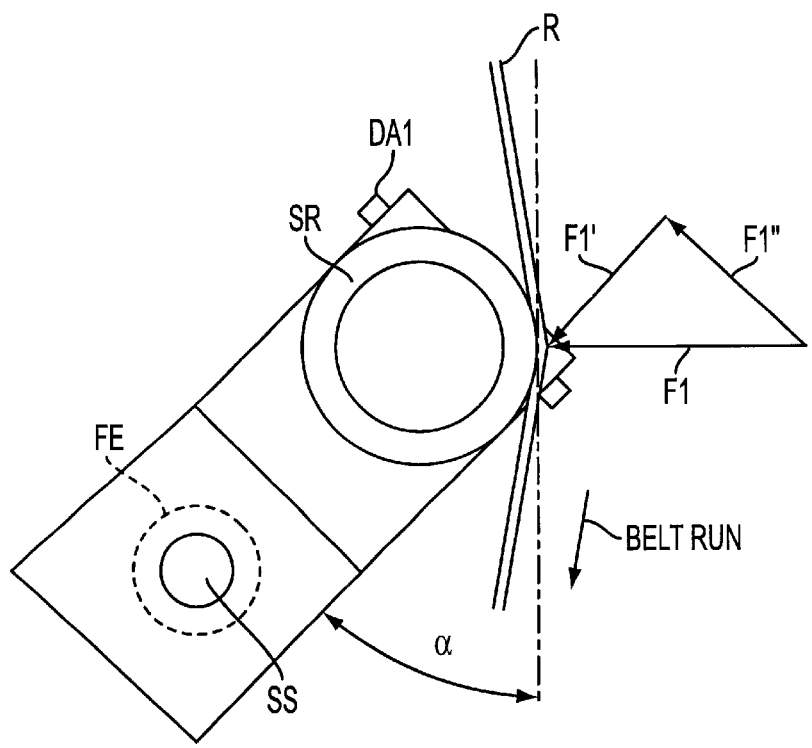
FIG. 2 is a plan view onto the device according to the invention according to FIG. 1.

According to FIG. 2, the device for correcting the run of the belt is inclined on the runout side of the belt by the angle α of approx. 45° compared to the tangential direction of the belt R at the adjusting roller SR. An inclined position in the range from 30° to 60° also turned out to be particularly advantageous for the control behavior.

The tangential direction of the belt R at the adjusting roller SR is the direction at which the angle between this tangential direction and the direction of the incoming and outgoing belt, respectively, is identical.

The belt R pushes against the adjusting roller SR with the force F1, according to the triangle of forces, the force F1' then acts in the direction of the inclination.

Figure 3A:
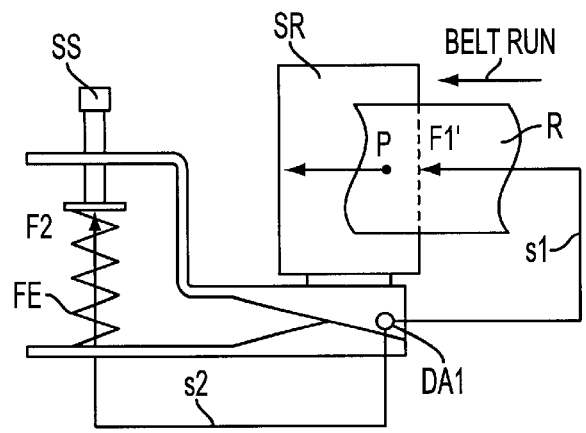
Figure 3B:
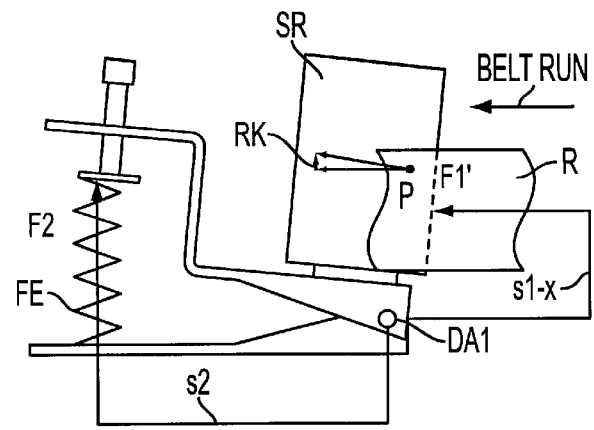
Figure 3C:
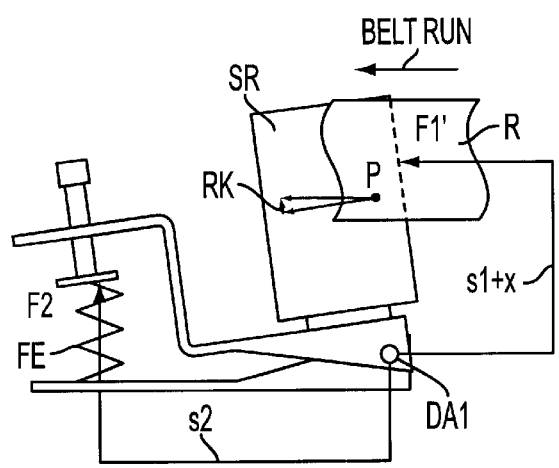

FIGS. 3a–c, which illustrates a side view A according to FIG. 2, details the operation of the device according to the invention with a straight roller.

According to FIG. 3a, a levorotary moment is generated at the rotary axis DA1 during a centered run of the belt via the force component F1' generated by the belt R and a lever arm whose length corresponds to the distance between the rotary axis DA1 and the center of the adjusting roller in the longitudinal direction s1. Due to the spring force F2 of the spring element FE and the lever arm having the effective length s2, a dextrorotary moment is created which maintains the system in its equilibrium.

If the belt R runs off in the downward direction as a result of a malfunction (FIG. 3b), the lever arm on the adjusting roller is reduced by the amount x to S1−x. The dextrorotary moment, which is caused by the spring force F2 and the lever arm having the effective length s2, is thus greater than the levorotary moment and the adjusting roller SR tilts toward the right. Because of the selected inclined position of the device according to the invention vis-a-vis the run of the belt, an upward directional component RK is imparted to each point P of the belt R which contacts the adjusting roller on the cylindrical surface of the adjusting roller SR, therewith compensating for the malfunction.

If the belt runs off in the upward direction (FIG. 3c), the lever arm on the adjusting roller SR is increased by the amount x to S1+x. This increases the levorotary moment and the roller tilts toward the left. Because of the direction of the run of the belt and the inclined position of the device according to the invention with respect to the run of the belt, the belt R contacts the adjusting roller SR only at the points at which it is given a downward directional component RK. This causes the belt R to be pulled downward opposite to the direction of the belt run malfunction. If, over time, the belt elasticity decreases and if there is no longer a compensation in the run of the belt, the force F1 or F1' also becomes smaller. This disturbs the necessary equilibrium of moments and the adjusting roller SR tilts to the right.

If, however, the dextrorotary moment is also made to be dependent on the belt elasticity, then both moments decrease when the belt elasticity decreases. This means that the ratio of the two torques remains intact and the equilibrium of moments is not disturbed.

Figure 4:
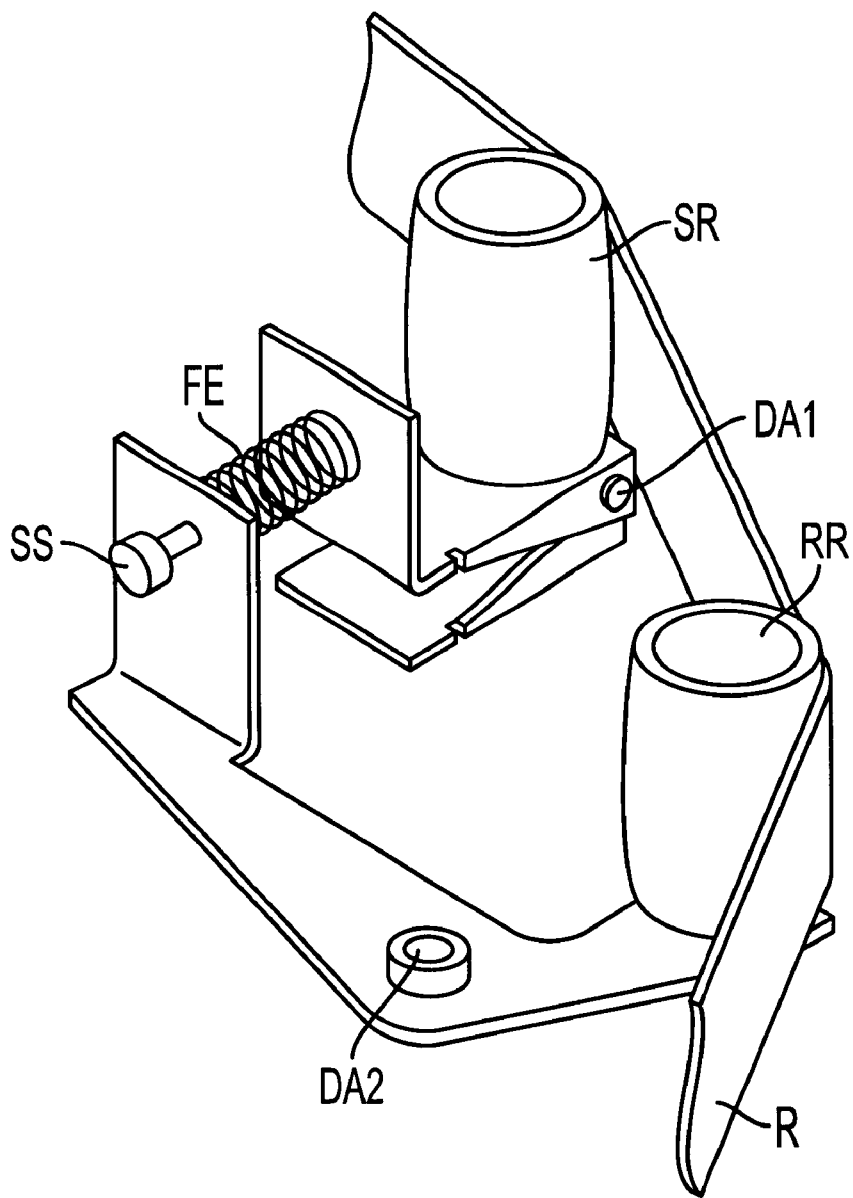
FIG. 4 is a perspective schematic representation of a device according to the invention, comprising an additional reference roller for compensating for belt tension changes.

Therefore, the dextrorotary moment is generated according to FIG. 4 via a reference roller RR. The reference roller RR is disposed on a lever arm pivotable in the rotary axis DA2, with the lever arm also being connected with the spring element FE. When the belt elasticity decreases, this changes the force F1' acting on the adjusting roller SR as well as the force that is exerted on the reference roller RR. If the spring element FE as well as the lever ratios are configured correctly, both torques change at the same ratio and the equilibrium of moments remains intact, that is, the adjusting roller SR does not tilt. If the belt runs off in the upward or downward direction, only the changed effective lever arm on the adjusting roller SR s1±x has an effect on the equilibrium of moments and the operation remains intact, even if the belt tension is changed.

What is claimed is:

1. A device for correcting the run of a belt for a letter sorting and distribution system, comprising:

a rotatable adjusting roller which contacts the belt, so that the belt runs on the roller in a running direction with an angle of wrap and having a tangential direction, the belt presenting a belt force against the adjusting roller;

a lever arm for supporting the adjusting roller, the lever arm being pivotable around a pivot axis so that the belt force provides a belt torque around the pivot axis, and the lever arm having a longitudinal axis perpendicular to the pivot axis and defining an angle of inclination between the longitudinal axis of the lever arm and the tangential direction of the belt; and a spring element having a spring constant and attached to the lever arm at a first mounting location at a distance from the pivot axis, for applying a spring force to the lever arm to generate a spring torque around the pivot axis, wherein the angle of wrap, the running direction, the tangential direction, the angle of inclination, the spring constant, and the first mounting location are provided so that the spring torque has a stable torque equilibrium with the belt torque when the belt force is centered on the adjusting roller, and wherein occurrence of an off-center deflection of the running of the belt on the adjusting roller causes tilting of the adjusting roller due to change in the torque equilibrium between the spring torque and t he belt torque on the adjusting roller, wherein the tilting of the roller moves the belt on the adjusting roller with a correction component in a direction opposite to the direction of the off-center deflection to correct centering of the belt.

2. A device according to claim 1, further comprising a rotating reference roller and a pivoting lever fixedly supporting the reference roller, wherein the spring element is attached to the pivoting lever at a second mounting location and applies the spring force at the second mounting location in a direction against the belt to maintain a sufficient belt tension, wherein the spring force acting on the pivoting lever at the second mounting location is in an opposite direction to the spring force acting on the lever arm at the first mounting location.

3. A device according to claim 1, wherein the spring force of the spring element is adjustable.

4. A device according to claim 1, wherein the rollers are crowned.

5. A device according to claim 1, wherein the angle of wrap on the adjusting roller is in a range from approximately 6° to 25°.

6. A device according to claim 1, wherein the angle of inclination of the lever arm is in a range from approximately 30° to 60° with respect to the tangential direction of the belt at the adjusting roller on a run-out side of the belt.

7. A device according to claim 2, wherein the spring force of the spring element is adjustable.

8. A device according to claim 2, wherein the rollers are crowned.

* * * * *